United States Patent
Leli et al.

(10) Patent No.: US 10,411,560 B2
(45) Date of Patent: Sep. 10, 2019

(54) ELECTRIC MACHINE HAVING A TANGENTIAL ARCHITECTURE WITH ENHANCED AIR COOLING

(71) Applicant: MAGNETI MARELLI S.P.A., Corbetta (IT)

(72) Inventors: Francesco Leli, Corbetta (IT); Marzio Lettich, Corbetta (IT); Matteo Cataldi, Corbetta (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 215 days.

(21) Appl. No.: 15/603,067

(22) Filed: May 23, 2017

(65) Prior Publication Data
US 2017/0346366 A1 Nov. 30, 2017

(30) Foreign Application Priority Data
May 30, 2016 (IT) .................. 102016000055657

(51) Int. Cl.
*H02K 9/22* (2006.01)
*H02K 9/04* (2006.01)
(Continued)

(52) U.S. Cl.
CPC .............. *H02K 9/04* (2013.01); *B60K 11/06* (2013.01); *H02K 5/18* (2013.01); *H02K 5/20* (2013.01);
(Continued)

(58) Field of Classification Search
CPC ............ H02K 5/18; H02K 5/20; H02K 5/225; H02K 9/22; H02K 11/33
See application file for complete search history.

(56) References Cited

U.S. PATENT DOCUMENTS

2013/0010426 A1* 1/2013 Nakano .................. H02K 11/33
361/690
2013/0167826 A1 7/2013 Feld
2013/0315692 A1 11/2013 Hsiung

FOREIGN PATENT DOCUMENTS

DE 102005032968 A1 2/2007
DE 102012011638 A1 1/2013
(Continued)

OTHER PUBLICATIONS

Italian Search Report dated Feb. 7, 2017 for Italian Patent Application No. UA20163927 (8 pages).
(Continued)

*Primary Examiner* — Ramon M Barrera
(74) *Attorney, Agent, or Firm* — Howard & Howard Attorneys PLLC (57) ABSTRACT

An electric machine having a tangential architecture comprising a rotor, rotating about an axis of rotation, a stator, coaxial to the rotor with respect to said axis of rotation, the stator comprising a casing which at least partially incorporates the rotor, a power supply body which incorporates a controller for the actuation, the power supply and the control of the electric machine. The power supply body is located outside the stator and parallel to the axis of rotation in a position substantially tangent to the casing of the stator. The controller includes a power module to power the electric machine. The power module is provided with a main heat sink, suitable to dissipate the thermal power emitted by the power module itself, and the power module is thermally insulated from the remaining controller.

20 Claims, 7 Drawing Sheets

(51) Int. Cl.
    *H02K 11/33*     (2016.01)
    *H02K 5/18*     (2006.01)
    *H02K 5/20*     (2006.01)
    *H02K 5/22*     (2006.01)
    *H02K 9/06*     (2006.01)
    *B60K 11/06*     (2006.01)
    *B60K 1/00*     (2006.01)

(52) U.S. Cl.
    CPC ............... *H02K 5/225* (2013.01); *H02K 9/06* (2013.01); *H02K 9/22* (2013.01); *H02K 11/33* (2016.01); *B60K 2001/006* (2013.01)

(56) References Cited

FOREIGN PATENT DOCUMENTS

EP     2639944 A1     9/2013
GB     2167608 A     5/1986

OTHER PUBLICATIONS

European Search Report for European Patent Application No. 17171565 dated Aug. 2, 2017.

\* cited by examiner

ELECTRIC MACHINE HAVING A TANGENTIAL ARCHITECTURE WITH ENHANCED AIR COOLING

CROSS-REFERENCE TO RELATED APPLICATIONS

The present application claims priority to and all the benefits of Italian Patent Application No. 102016000055657, filed on May 30, 2016, which is hereby expressly incorporated herein by reference in its entirety.

BACKGROUND OF THE INVENTION

1. Field of the Invention

The present invention relates to an electric machine having a tangential architecture with enhanced air cooling.

2. Description of the Related Art

As is well known, electric machines are provided with power electronics for the corresponding actuation and control. Said electronics, comprising corresponding boards, requires a corresponding cooling. Several solutions are known in the art for this purpose, which provide for both liquid cooling solutions, typically water, and air cooling solutions.

Water cooling solutions allow a greater heat dissipation but, on the other hand, entail greater costs, encumbrance and weight; furthermore, it is necessary to provide the cooling systems with reliable hydraulic seals, to prevent any leakage of cooling liquid.

Air cooling solutions are instead lighter, simpler and cheaper to achieve; in fact, they provide for the keying of one or more fans on the shaft of the rotor of the electric machine. In this way, during the rotation of the rotor, a flow of air is automatically generated, which removes heat from the parts of the machine to be cooled down.

The air cooling solution, however, poses some issues, due to the limited heat dissipation capacity of air cooling systems with respect to water cooling ones.

In fact, the gaseous medium, in particular air, has less cooling capacity with respect to a refrigerating liquid. Furthermore, the cooling capacity and efficiency of the fans keyed on the shaft of the rotor obviously depend on the rotation speed of the shaft itself, since the generated air flow rate directly depends on the rotation speed of the rotor itself.

As a result, the cooling efficiency and effectiveness are reduced when the rotation speed of the rotor is decreased. This limit may lead to major drawbacks, for example, when the electric machine works under torque at low rotation speed: in such operating condition, the electric machine would require greater heat dissipation but, due to the low rotation speed, the flow of air generated is insufficient to provide adequate refrigeration.

As a result, when using electric machines with air cooling systems, it becomes essential to increase as much as possible the efficiency of the systems themselves, so as to ensure an adequate cooling of the power electronics of the electric machine in all operating conditions. Otherwise, and especially when increasing the power of the electric machines to be used, the tendency nowadays is to pass to liquid refrigeration systems, which, however, entail the aforementioned drawbacks, mainly related to costs, encumbrance and size.

The aforementioned issues are further accentuated when cooling down electric machines having a tangential architecture, i.e. having power electronics, with the corresponding electronic board, tangentially arranged with respect to the cylindrical stator body. In fact, with this specific architecture, when using air cooling systems, greater issues are encountered for adequately refrigerating the power electronics of the electric machine.

Furthermore, in the specific configuration of an electric machine having a tangential architecture, an effective sizing of the cooling system is essential to achieve the required performance, while maintaining a compact design.

In fact, in order to make the best use of the flow of air drawn by the fans integral to the rotor, it is necessary to introduce arrangements, which allow to integrate the power electronics with the motor.

Such arrangements shall allow to optimize the refrigeration of the electric machine, so as to be reliable in terms of performance, while maintaining a compact design and therefore a very limited encumbrance.

SUMMARY OF THE INVENTION

Therefore, the need to resolve the abovementioned drawbacks and limitations with reference to the prior art is felt.

Therefore, the need is felt to provide an electric machine having air cooling, ensuring an adequate and efficient refrigeration of the machine in all operating conditions, even when the rotor rotates at full load and at low rotation speed.

Such need is met by an electric machine having a tangential architecture comprising a rotor, rotating about an axis of rotation, and a stator, coaxial to the rotor with respect to said axis of rotation. The stator includes a casing which incorporates at least partially the rotor, a power supply body including a controller that controls the actuation, and power supply of the electric machine. The power supply body is placed outside the stator and parallel to the axis of rotation in a position substantially tangent to the casing of the stator. The controller includes a power module to power the electric machine, wherein the power module is provided with a main heat sink, suitable to dissipate the thermal power emitted by the power module itself. The power module is thermally insulated from the remaining controller.

Other objects, features and advantages of the present invention will be readily appreciated as the same becomes better understood after reading the subsequent description taken in connection with the accompanying drawings.

BRIEF DESCRIPTION OF THE DRAWINGS

Further features and advantages of the present invention will become more apparent from the following description of the indicative and non-limiting embodiments thereof, in which.

Common elements or parts of elements in the embodiments described below will be indicated with the same reference numerals.

DETAILED DESCRIPTION OF THE INVENTION

With reference to the aforementioned figures, an overall schematic view of an electric machine in accordance with the present invention has been generally indicated with 4.

For the purposes of the scope of protection of the present invention, the specific type of electric machine is not relevant, electric machine being intended as any machine suitable to operate as a motor and/or generator, of any dimension, or shape, size and power.

The electric machine 4 comprises a rotor 8, rotating about an axis of rotation X-X, and a stator 12, coaxial to the rotor 8 with respect to said axis of rotation X-X. The stator 12 comprises a casing 16 which incorporates at least partially the rotor 8. The electric machine 4 further comprises a power supply body 20 which incorporates a controller 21 that controls the actuation, power supply of the electric machine 4. The controller 21, for the purposes of the present invention, may be of any type, size, power.

The power supply body 20 is placed outside the stator 12 and parallel to the axis of rotation X-X in a position substantially tangent to the casing 16 of the stator 12: the naming electric machine having a tangential architecture derives from this specific 'tangential' positioning of the power supply body 20, with the corresponding controller 21, with respect to stator.

The controller 21 comprise a power module 22 to power the electric machine 4.

The power module 22 constitutes the main power supply module of the electric machine 4, and for this reason, it is also the module which heats up more and which requires greater cooling. The controller includes, for example, electric circuits 100 and capacitors 104.

Advantageously, the power module 22 is provided with a main heat sink 23, suitable to dissipate the thermal power emitted by the power module 22 itself.

Furthermore, the power module 22 is thermally insulated from the remaining controller 21 of the electric machine 4.

According to an embodiment, the power module 22 is provided with an insulating frame 25 which peripherally surrounds the power module 22 so as to thermally insulate it from the remaining controller 21.

The insulating frame 25 may have any geometry; for example, it has a rectangular geometry; preferably, the insulating frame 25 extends along a closed polyline so as to peripherally and seamlessly surround the power module 22.

For example, the insulating frame 25 is made of a thermally insulating material, such as a plastic material. The use of a plastic material is only indicative, since it is possible to use, alternatively or in combination, any other insulating material suitable to achieve a thermal break.

Said insulating frame 25 is interposed between the power supply body 20 and the power module 21 fitted with the corresponding main heat sink 23.

According to an embodiment, between the insulating frame 25 and the power supply body 20 at least one first perimetral gasket 26 is arranged.

According to an embodiment, between the insulating frame 25 and the main heat sink 23 at least one second perimetral gasket 27 is arranged.

The use of the perimetral gaskets 26, 27 helps to obtain the thermal break between the power module 22 and the power supply body 20; in fact, the insulation provided by the gaskets contrasts, synergistically with the insulating frame 25, the thermal exchange between the power module 22 and the power supply body 20.

According to an embodiment, the controller 21 includes a secondary heat sink 29, thermally separate from said main heat sink 23, suitable to dissipate heat produced by the controller 21, with the exception of the power module 22. For example, the secondary heat sink 29 comprises a plurality of fins to favor heat dissipation.

According to an embodiment, the rotor 8 comprises a first and a second cooling fan 24, 28, keyed on respective first and second axial ends 32, 36 of the rotor 8, opposite along said axis of rotation X-X.

The first and second cooling fans 24, 28 act to generate respectively, with the rotation of the rotor 8, with which they integrally rotate, a first and a second flow of cooling air independent from one another.

In particular, the first flow of cooling air is directed toward the first axial end 32 of the rotor 8, and the second flow of cooling air is directed toward the power supply body 20 so as to cool down the controller 21.

Preferably, said first and second cooling fans 24, 28 are radial fans which aspirate air in the axial direction A-A, substantially parallel to said axis of rotation X-X, and expel it in the radial direction R-R, substantially perpendicular to said axis of rotation X-X.

The casing 16 defines, near the first axial end 32, a first ventilation chamber 40 having at least one front opening 44 facing the first cooling fan 24, so that it aspirates air through the front opening 44, conveys it to the first ventilation chamber 40 to skim the first axial end 32 of the rotor 8 and expels it radially from at least one radial opening 48 arranged near the first axial end 32 itself.

The first ventilation chamber 40 is substantially fluidically insulated from a second ventilation chamber 52, defined by the casing 16 and housing the second axial end 32 of the rotor 8.

The casing 16 defines, at the second axial end 36, the second ventilation chamber 52 housing the second cooling fan 28. The second ventilation chamber 52 is fluidically connected to a cooling channel 56 adjacent to the controller 21. In this way, a flow of cooling air passing through the cooling channel 56 is capable of removing heat from said controller 21.

Preferably, the cooling channel 56 extends along a main axial direction A-A, parallel to the axis of rotation X-X, between the first and second axial ends 32, 36 of the rotor 8.

According to an embodiment, the cooling channel 56 extends from an inlet mouth 60, arranged on the side of the first axial end 32, to an outlet mouth 64 of the second ventilation chamber 52, so as to direct the second flow of cooling air from the first axial end 32 to the second ventilation chamber 52, skimming and therefore cooling down the controller 21.

Figure 1:
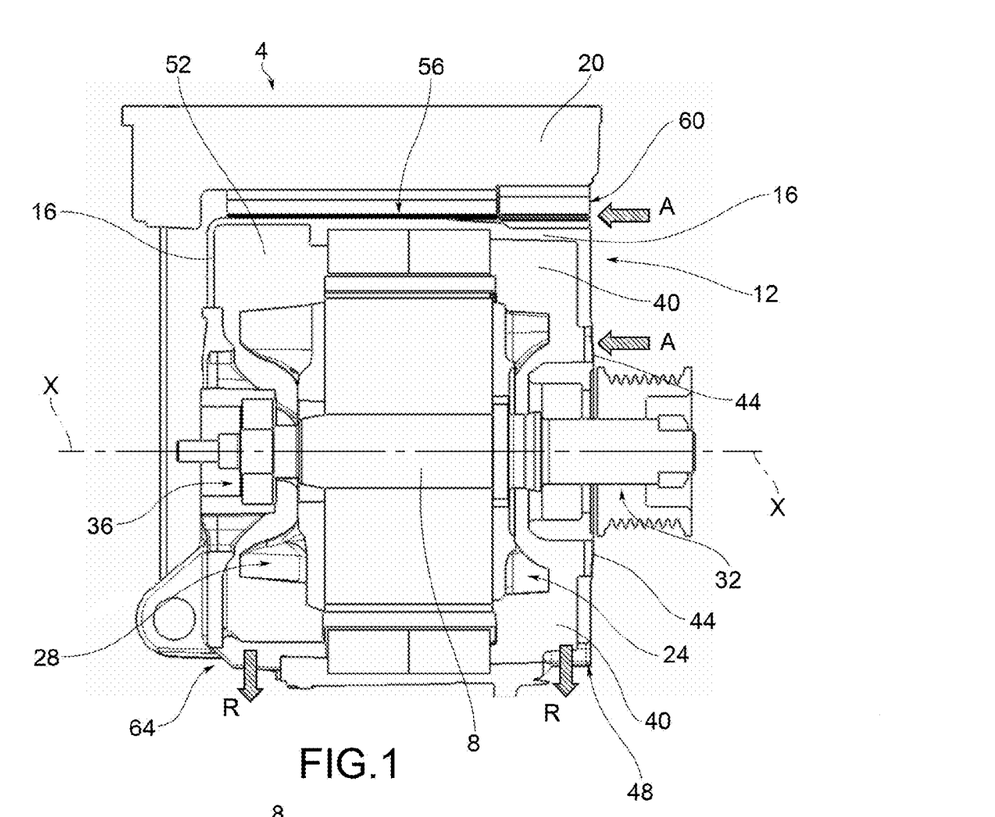
FIG. 1 shows a sectional view of an electric machine having a tangential architecture in accordance with an embodiment of the present invention.
Figure 2:
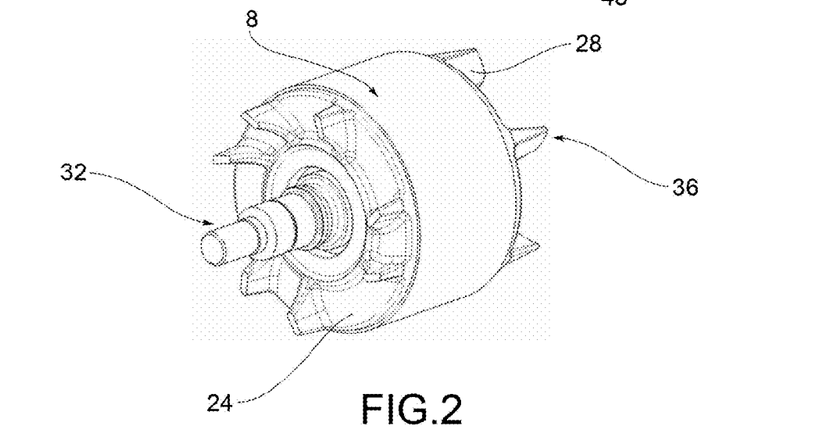
FIG. 2 shows a perspective view of a rotor of the electric machine of FIG. 1.
Figure 3:
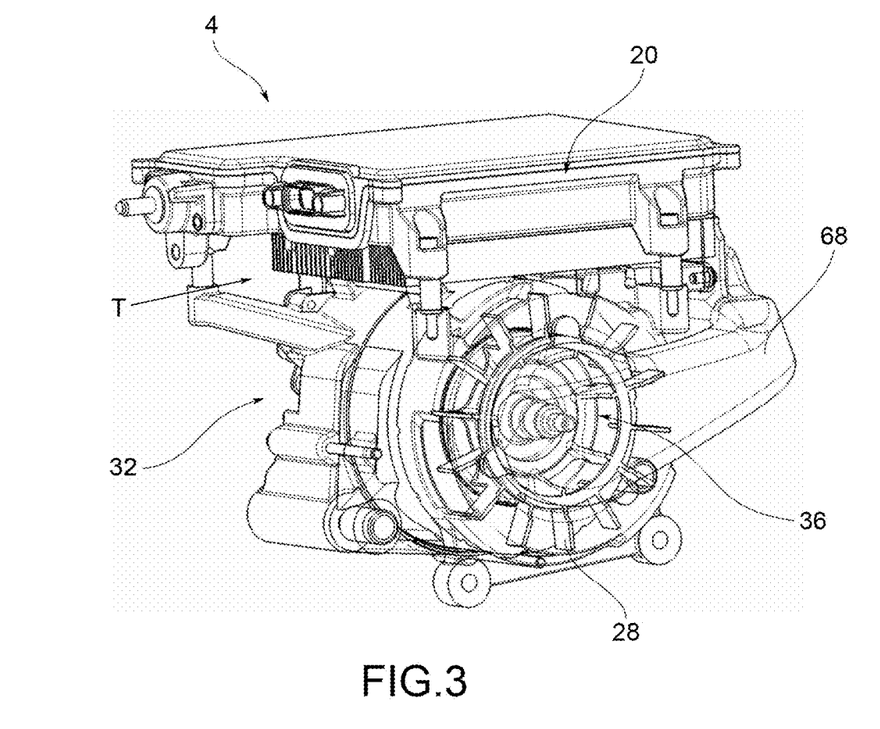
FIG. 3 shows a perspective view of an electric machine in accordance with a further embodiment of the present invention.
Figure 4:
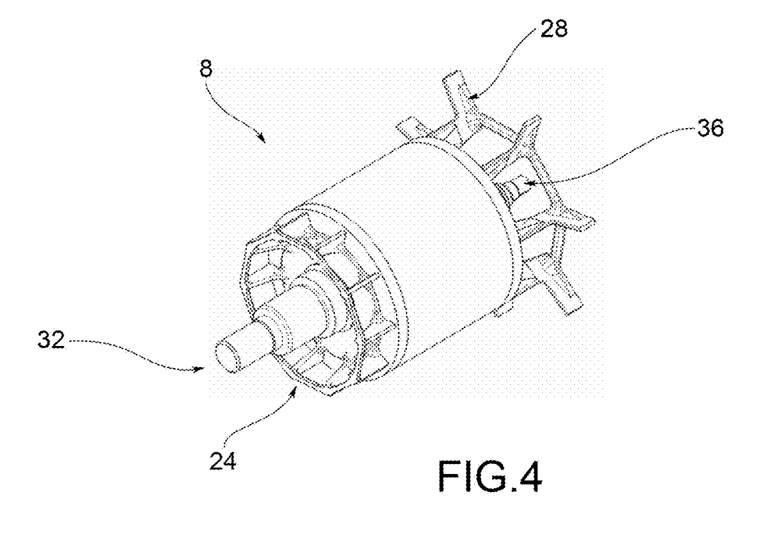
FIG. 4 shows a perspective view of a rotor of the electric machine of FIG. 3.
Figure 5:
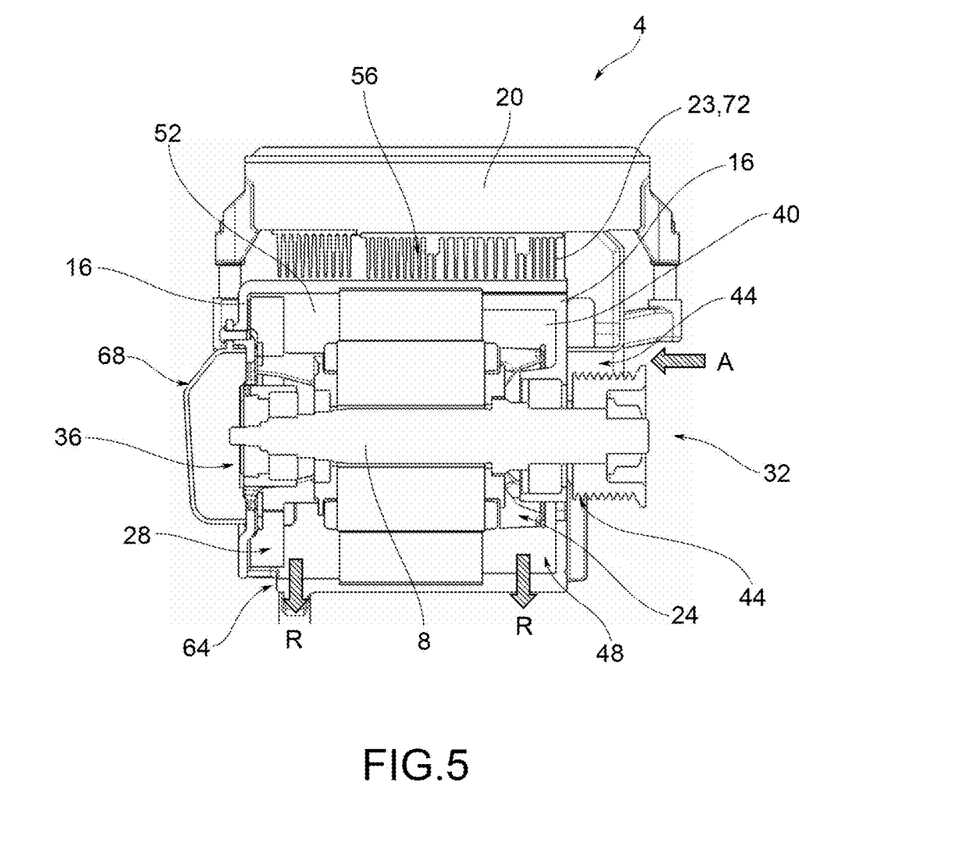
FIG. 5 shows a sectional view of the electric machine of FIG. 3.
Figure 6:
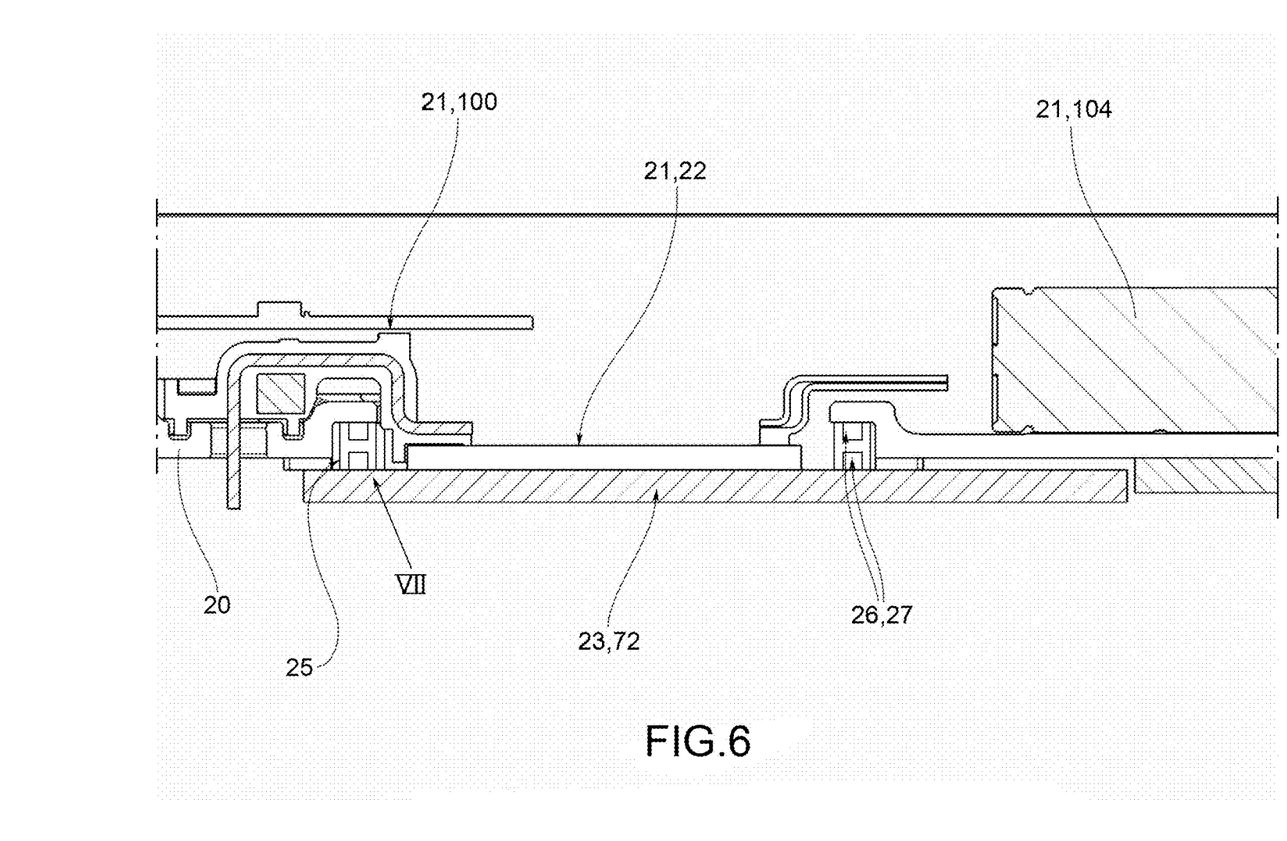
FIG. 6 shows a partial sectional view of a power supply body of an electric machine in accordance with the present invention.
Figure 7:
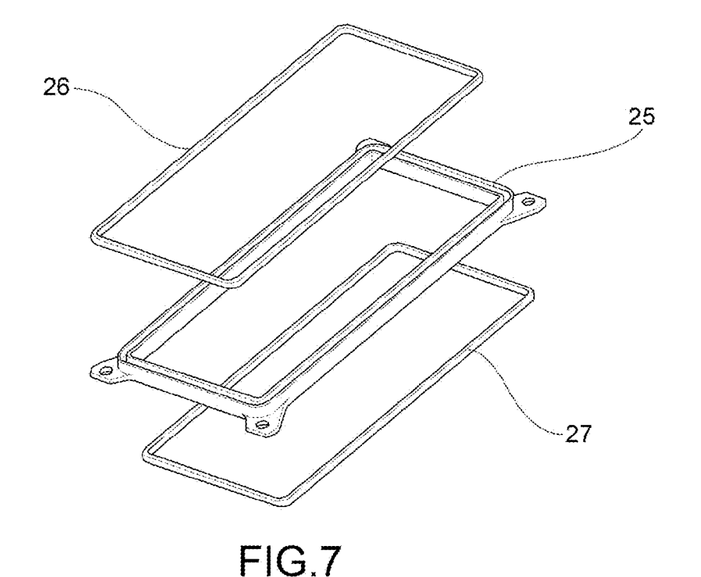
FIG. 7 shows a perspective view, in separate parts, of the detail VII of FIG. 6.

According to a possible embodiment (FIG. 1), said inlet mouth 60 is oriented according to a main axial extension axis A-A, parallel to the axis of rotation X-X.

Figure 11:
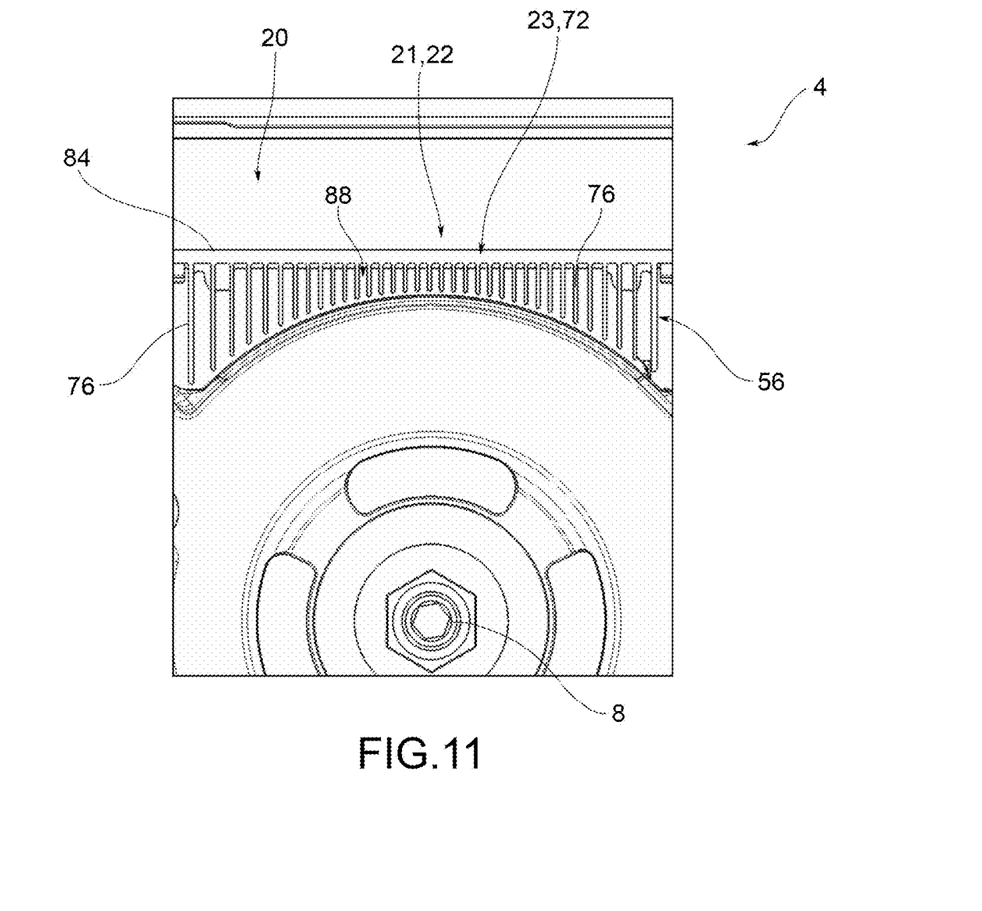
FIG. 11 shows a partial front view of an electric machine in accordance with the present invention.

According to a further embodiment (FIGS. 11, 13) said inlet mouth 60 is oriented according to a main tangential extension axis T-T perpendicular to the axis of rotation X-X and substantially tangent to the casing 16 of the stator 12.

The flow of cooling air passing through the cooling channel 56 may be directed toward the second ventilation chamber 52 by an appropriate conveyor channel 68.

The inlet mouth 60 is fluidically separate from the front opening 44 of the first ventilation chamber 40. In this way, the respective first and second flows of cooling air do not interfere with one another and do not create turbulences which may compromise the effectiveness of the flows themselves and therefore the efficiency of the cooling fans 24, 28.

The cooling channel 56 may have several configurations; according to a possible embodiment, the cooling channel 56, with respect to a cross-section plane perpendicular to said axis of rotation X-X, presents a polygonal cross-section (FIG. 19) defined between the casing 16 of the stator 12, the power supply body 20 and a pair of side walls.

According to an embodiment, the main heat sink 23 comprises at least one heat sink element with fins 72, fitted with a plurality of cooling fins 76 having a variable height 80 along the angular extension of the casing 16 of the stator 12, said height being defined by the distance between a support wall 84 of the power supply body 20, connected to the controller 21, and the casing 16 of the stator 12.

Preferably, said heat sink element with fins 72 is housed inside a cooling channel 56 defined between the casing 16 of the stator 12 and the power supply body 20 with respect to a radial direction R-R, perpendicular to the axis of rotation X-X and incident therewith; the cooling channel 56 conveys a flow of cooling air generated by at least one cooling fan 24, 28 keyed on the rotor 8 and integral therewith in rotation.

The support wall 84 of the power supply body 20 is connected to the controller 21, directly or by the interposition of a heat conduction fastening mechanism, so as to allow the flow of heat from the controller 21 toward the cooling fins 76, and therefore toward the cooling channel 56.

The cooling fins 76 are separate one another so as to divide the cooling channel 56 into a plurality of axially directed laminated ventilation ducts 88.

With regard to the type of cooling fans keyed on the rotor 8, according to a possible embodiment, the first and/or the second cooling fan 24, 28 comprise a plurality of rectilinear radial blades 92 having a rectilinear radial cross-section passing through the axis of rotation X-X, with respect to a cross-section plane perpendicular to said axis of rotation X-X.

According to a further possible embodiment, the first and/or the second cooling fan 24, 28 comprise a plurality of curvilinear blades 96, having a curvilinear cross-section, with respect to a cross-section plane perpendicular to said axis of rotation X-X.

The operation of an electric machine according to the present invention will now be described.

In particular, the first cooling fan 24, for example arranged on the side of a pulley, aspirates by the adequate front openings 44, conveys the aspirated air on the corresponding first axial end 32 of the rotor 8, which is therefore cooled down, and expels the air through special radial openings 48. This air flow is devoted to the cooling of the first axial end 32 of the rotor-stator assembly of the electric machine 4.

The second cooling fan 28 similarly aspirates and conveys the air through special inlet mouths 60. Unlike the first flow of cooling air, the air thus aspirated axially passes through the entire electric machine 4, via the cooling channel 56 housing the heat sink with fins 72, in particular the main heat sink 23, suitably shaped so as to match the outer geometry of the motor.

The second flow of cooling air thus produced is operationally arranged both for the cooling of the power electronics, i.e. the controller 21, and for the cooling of the remaining axial portion of rotor 8 and stator 12 of the electric machine 4: in fact, after having cooled down the power electronics, it reaches the second axial end 36 of the rotor 8 and exits in the radial direction R through the outlet mouth 64.

Therefore, the two cooling air flow rates thus produced constitute two flows of air independent from one another, the function of which is to cool down specific portions of electric machine 4, without said two flows being influenced one another.

With specific regard to the cooling of the controller 21, as seen, the power module 22 is provided with a main heat sink 23, suitable to dissipate the thermal power emitted by the power module 22 itself. The power module 22 is thermally insulated from the remaining controller 21 of the electric machine 4. Therefore, the heat generated by the power module 22 is substantially confined inside the volume defined by the insulating frame 25 and by the respective perimetral gaskets 26, 27, and driven therefrom outside by the main heat sink 23, 72. Via the main heat sink 23, the heat flow generated by the power module 22 is removed by the flow of cooling air which runs over the main heat sink 23 inside the cooling channel 56.

With regard to the further controller 21, such as, for example, the electronic circuit 100 and/or the capacitors 104, they are thermally insulated from the power module 22 so as not to be overheated by the heat generated thereby. Furthermore, the controller 21 are cooled down by the action of the secondary heat sink 29.

Figure 8:
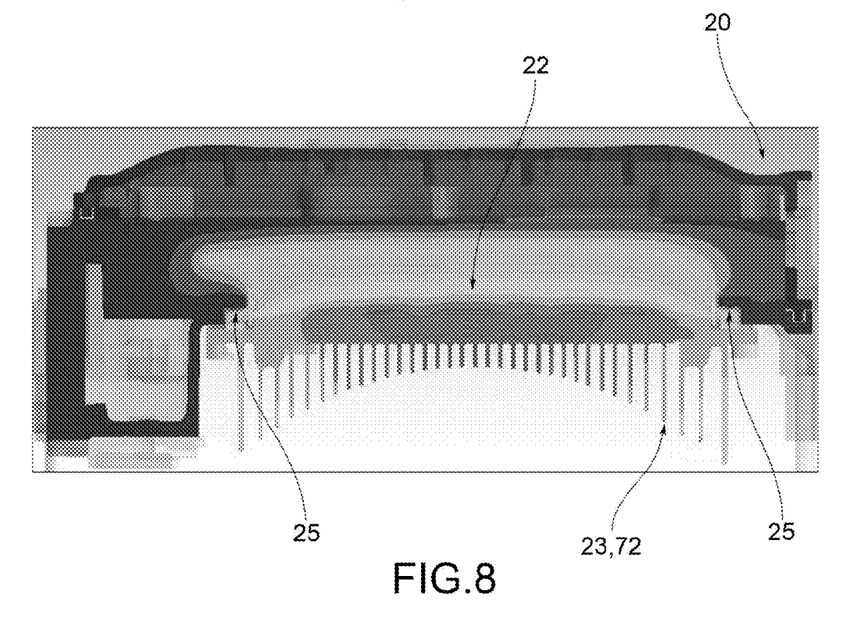
FIGS. 8-9 show heat analysis of an electric machine in accordance with the present invention, in operating condition.
Figure 9:
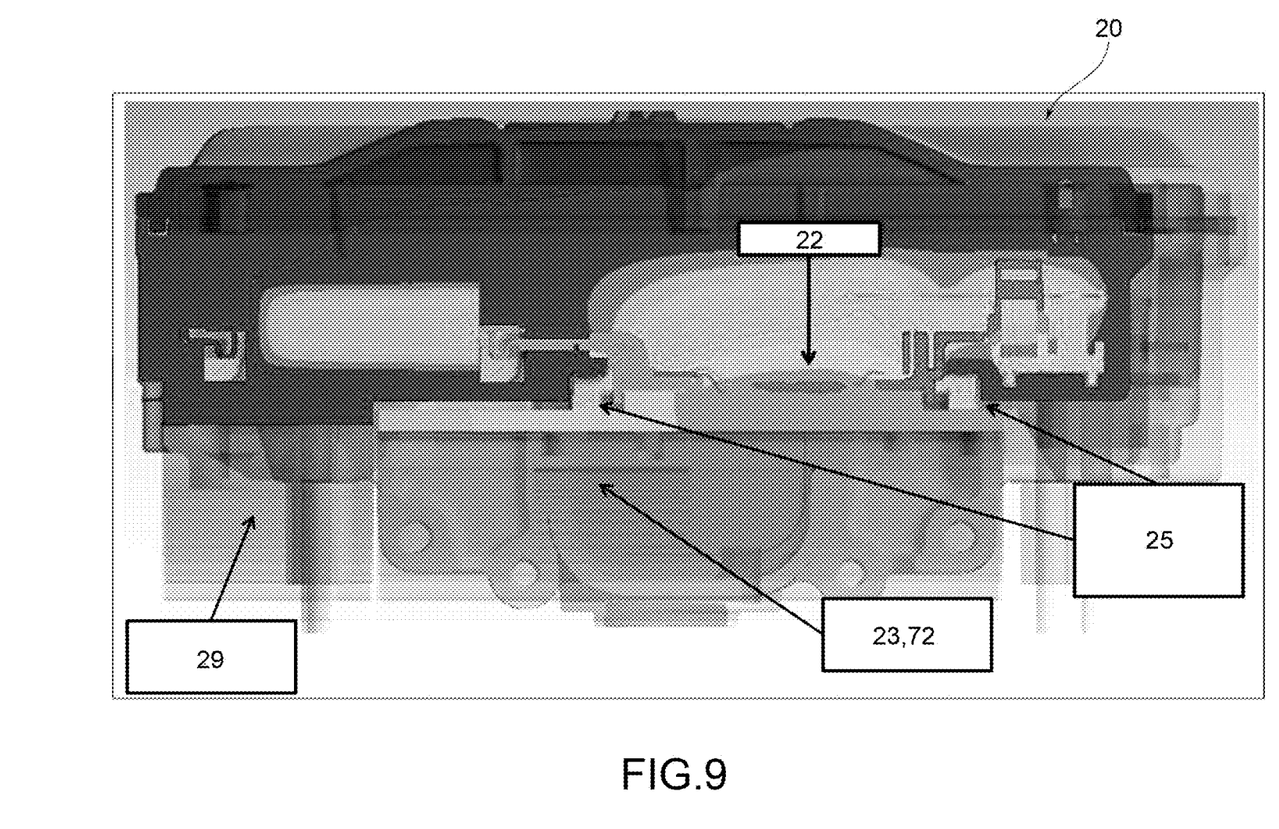
Figure 10:
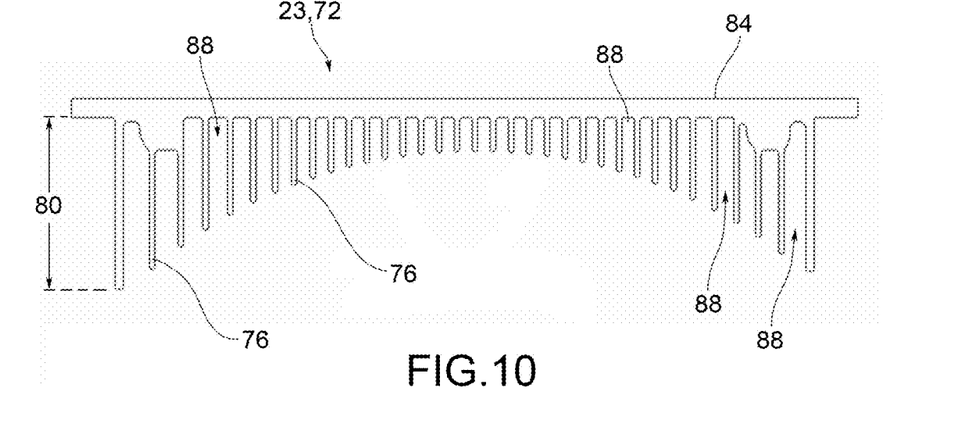
FIG. 10 shows a view of a heat sink with fins of an electric machine in accordance with the present invention.

FIGS. 8-9 show heat analysis of an electric machine in accordance with the present invention, in operating condition. The darker areas correspond to a greater temperature.

As it may be noticed, the heat is concentrated in the area of the power module 22 and cannot move toward the further controller 21 thanks to the thermal break performed by the insulating frame 25. The heat may therefore flow toward the main heat sink 23, 72 and, by the latter, be removed by the flow of cooling air generated by the respective fans, in particular by the second cooling fan 28.

As it may be appreciated from the foregoing, the electric machine according to the invention allows to overcome the drawbacks presented in the prior art.

In particular, the cooling system of the present invention allows the use of the electric machines having a tangential architecture so as to limit encumbrance and costs.

Such cooling system achieves the thermal decoupling of the power module, supplying power to the electric machine, from the rest of the electronic components.

In fact, the power module is the element which generates greater power, and therefore greater heat, inside the power supply body containing the electronics of the electric machine. If the power module was fastened directly on the power supply body, there would be co-existence issues with the other electronic components, due to the low thermal resistance interposed.

To this end, thanks to the solution of the present invention, the fastening of the power module is provided for directly on a dedicated heat sink, which in turn is thermally insulated from the power supply body thanks to the interposition of the insulating frame, or with low thermal conductivity.

An insulating frame is interposed between the power module heat sink and the power supply body, thus advantageously achieving the thermal decoupling of the power module of the electric machine from the rest of the components.

With such a solution, there is a reduction in the encumbrance and cost of the electric machine, since it makes the proximity between the power module and the other components possible, allowing to continuously work in a compatible way with the different technological limits of the components involved.

In this way, a main heat sink, made for example of aluminum, is completely dedicated to the power module, while the other electronic components are cooled down by another devoted secondary dissipation element. This latter secondary heat sink is placed at an appropriate distance, so as not to receive heat from the main heat sink of the power module.

The insulating frame is the component which allows to thermally insulate the power module from the rest of the electronic components: in fact, the insulating frame is, for example, made of thermoplastic material and surrounds the power module. The insulating frame achieves a seal by means of the integration of the gaskets and is placed between the power module main heat sink and the power supply body.

Furthermore, the researched solution adopts radial fans directly keyed on the shaft so as to ensure a reliable and cost-effective solution.

The two fans, arranged at opposite axial ends of the rotor, generate flows of cooling air independent from one another, each optimized for refrigerating a corresponding portion of the electric machine.

In this way, it is possible to optimize each flow of cooling air without this being influenced by the other. In other words, the independence of the two flows of cooling air allows to optimize each of the flows, preventing one from compromising or anyway reducing the efficiency of the other in all operating conditions of the electric machine.

The specific arrangement and configuration of the fans allow an effective air cooling in the electric machines having a tangential architecture, as both the power electronics and the further parts of the rotor and of the stator are effectively cooled down.

In particular, with regard to the power electronics, a specific cooling fan is employed capable of directing a flow of cooling air into a specific channel or slot arranged between the electronic board and the outer side surface of the stator, in a direction substantially tangential to the latter.

The use of specific power electronics cooling fins, at least partially counter-shaped with respect to the outer side surface of the stator, synergistically contributes to the enhancement of the efficiency of the cooling of the power electronics. In fact, such configuration of the cooling fins allows to make the best of the volume available between the outer side surface of the rotor and the power electronics itself; in this way, on the one hand, the heat exchange surface available for the cooling fins is increased, and on the other hand, the direction of the cooling flow generated by the fan specifically designed for the cooling of the power electronics is further defined.

Furthermore, the present invention provides an air cooling system for electric machines which is particularly light and cheap to be manufactured. In fact, the solution adopts radial fans directly keyed on the rotor shaft, so as to ensure a reliable and cost-effective solution.

Furthermore, the use of an air cooling system further allows to avoid the use of pumps, ducts and corresponding sealing gaskets typical of liquid cooling systems.

In order to meet contingent and specific needs, a person skilled in the art may make many changes and variations to the electric machines described above, all of which are also encompassed by the scope of the invention as defined by the following claims.

The invention claimed is:

1. An electric machine having a tangential architecture comprising:
   a rotor, rotating about an axis of rotation,
   a stator, coaxial to the rotor with respect to said axis of rotation,
   the stator comprising a casing which incorporates at least partially the rotor,
   a power supply body including a controller that controls the actuation, and power supply of the electric machine, the power supply body being placed outside the stator and parallel to the axis of rotation in a position substantially tangent to the casing of the stator, the controller including a power module to power the electric machine,
wherein
   the power module is provided with a main heat sink, suitable to dissipate the thermal power emitted by the power module itself,
   the power module is thermally insulated from the remaining controller.

2. The electric machine having a tangential architecture as set forth in claim 1, wherein the power module is provided with an insulating frame that peripherally surrounds the power module so as to insulate it thermally from the remaining controller.

3. The electric machine having a tangential architecture as set forth in claim 2, wherein said insulating frame is made of a thermally insulating material, such as a plastic material.

4. The electric machine having a tangential architecture as set forth in claim 2, wherein said insulating frame is interposed between the power supply body and the power module fitted with the corresponding main heat sink.

5. The electric machine having a tangential architecture as set forth in claim 2, wherein between the insulating frame and the power supply body at least one first perimetral gasket is arranged.

6. The electric machine having a tangential architecture as set forth in claim 2, wherein between the insulating frame and the main heat sink at least one second perimetral gasket is arranged.

7. The electric machine having a tangential architecture as set forth in claim 1, wherein the main heat sink element comprises a heat sink element with fins, fitted with a plurality of cooling fins having a variable height along the angular extension of the casing of the stator, said height being defined by the distance between a support wall of the power supply body, connected to the controller, and the casing of the stator.

8. The electric machine having a tangential architecture as set forth in claim 7, wherein said heat sink finned element is housed inside a cooling channel defined between the casing of the stator and the power supply body in a radial direction, perpendicular to the axis of rotation and incident with it, the cooling channel conveying a flow of cooling air generated by at least one cooling fan keyed on the rotor and integral therewith in rotation.

9. The electric machine having a tangential architecture as set forth in claim 8, wherein the cooling channel extends along a main axial direction, parallel to the axis of rotation, between the first and second axial ends of the rotor.

10. The electric machine having a tangential architecture as set forth in claim 8, wherein the cooling channel, with respect to a cross-section plane perpendicular to said axis of rotation, presents a polygonal cross-section defined between the casing of the stator, the power supply body and a pair of side walls.

11. The electric machine having a tangential architecture as set forth in claim 1, wherein the controller includes a secondary heat sink, thermally separate from said main heat sink, suitable to dissipate heat produced by the controller.

12. The electric machine having a tangential architecture as set forth in claim 1, wherein the rotor comprises a first and a second cooling fan, keyed on respective first and second axial ends of the rotor, opposite along said axis of rotation,
said first and second cooling fans acts to generate respectively, with the rotation of the rotor, a first and a second flow of cooling air independent of each other,
wherein the first flow of cooling air is directed toward the first axial end of the rotor,
wherein the second flow of cooling air is directed toward the power supply body in order to cool down the controller.

13. The electric machine having a tangential architecture as set forth in claim 12, wherein said first and second cooling fans are radial fans which aspirate air in the axial direction, substantially parallel to said axis of rotation, and expel it in the radial direction, substantially perpendicular to said axis of rotation.

14. The electric machine having a tangential architecture as set forth in claim 12, wherein the casing defines, near the first axial end, a first ventilation chamber having at least one front opening facing the first cooling fan, so that it aspirates air through the front opening, conveys it to the first ventilation chamber to skim the first axial end of the rotor and expel it radially from at least one radial opening placed near said first axial end.

15. The electric machine having a tangential architecture as set forth in claim 14, wherein said first ventilation chamber is substantially fluidically insulated from a second ventilation chamber, defined by the casing and housing the second axial end of the rotor.

16. The electric machine having a tangential architecture as set forth in claim 12, wherein the casing defines, at the second axial end, a second ventilation chamber housing the second cooling fan, the second ventilation chamber being fluidically connected to a cooling channel adjacent to the controller said cooling channel housing the main heat sink.

17. The electric machine having a tangential architecture as set forth in claim 16, wherein the cooling channel extends from an inlet mouth, placed on the side of the first axial end, to an outlet mouth of the second ventilation chamber, so as to direct the second flow of cooling air flow from the first axial end to the second ventilation chamber, skimming the controller.

18. The electric machine having a tangential architecture as set forth in claim 17, wherein said inlet mouth is oriented according to the main axial extension axis, parallel to the axis of rotation.

19. The electric machine having a tangential architecture as set forth in claim 17, wherein said inlet mouth is oriented according to a main tangential extension axis, perpendicular to the axis of rotation and substantially tangent to the casing of the stator.

20. The electric machine having a tangential architecture as set forth in claim 17, wherein the inlet mouth is fluidically separate from the front opening of a first ventilation chamber.

* * * * *